(12) United States Patent
Twomey (10) Patent No.: US 7,279,676 B2
(45) Date of Patent: Oct. 9, 2007

(54) POSITION SENSITIVE RADIATION SPECTROMETER

(75) Inventor: Timothy R. Twomey, Berkshire (GB)

(73) Assignee: Advanced Measurement Technology, Inc., Oak Ridge, TN (US)

( * ) Notice: Subject to any disclaimer, the term of this patent is extended or adjusted under 35 U.S.C. 154(b) by 352 days.

(21) Appl. No.: 11/126,924

(22) Filed: May 11, 2005

(65) Prior Publication Data

US 2006/0255254 A1    Nov. 16, 2006

(51) Int. Cl.
*G01D 18/00* (2006.01)
*G12B 13/00* (2006.01)

(52) U.S. Cl. .............................. 250/252.1; 250/370.09; 378/54; 378/56

(58) Field of Classification Search .............. 250/252.1, 250/370.09; 378/51, 53, 54, 56, 57
See application file for complete search history.

(56) References Cited

U.S. PATENT DOCUMENTS

| | | | | |
|---|---|---|---|---|
| 4,962,315 A | * | 10/1990 | Kawasaki et al. | 250/336.1 |
| 5,481,115 A | * | 1/1996 | Hsieh et al. | 250/363.04 |
| 5,990,482 A | * | 11/1999 | Bertelsen et al. | 250/363.04 |
| 6,072,177 A | * | 6/2000 | McCroskey et al. | 250/252.1 |
| 6,624,425 B2 | * | 9/2003 | Nisius et al. | 250/393 |
| 2006/0065825 A1 | * | 3/2006 | Ishitsu et al. | 250/252.1 |
| 2006/0065832 A1 | * | 3/2006 | Orr | 250/336.1 |

* cited by examiner

*Primary Examiner*—David Porta
*Assistant Examiner*—David S Baker
(74) *Attorney, Agent, or Firm*—Pitts & Brittian, PC (57) ABSTRACT

A position sensitive radiation spectrometer for identifying, quantifying, and locating a radioactive source in a target. The position sensitive radiation spectrometer includes an array of gamma-ray detectors arranged along one or more dimensions of a container to be assayed. A known source placed at various calibration positions is used to establish counting efficiencies at various energy levels. From the counting efficiency and the actual count rate, the activity level of an unknown source relative to the calibration positions is calculated. The relative activity levels correlate to the position of unknown source and provide useful information about the actual distribution of radioactive material.

12 Claims, 6 Drawing Sheets

POSITION SENSITIVE RADIATION SPECTROMETER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates to a radiation spectrometer. More specifically, a radiation spectrometer of the present invention identifies, quantifies and accurately locates radioactive material.

2. Description of the Related Art

Locating and identifying radioactive sources is a common task in the areas of radiation protection, radioactive waste control, nuclear proliferation and homeland security. Gamma-rays penetrate surrounding materials without losing their characteristic energies so identifying the particular radioactive isotopes in the source is done by gamma-ray spectroscopy.

Most gamma-ray detectors give only a limited amount of position information. The amount of radiation that is detected from a point gamma-ray source reduces as the distance, d, increases according to the formula: one divided by the distance squared. This relationship between energy and distance causes the count rate to increase as the gamma-ray detector is placed nearer to the source, thus providing some position information. Some practical problems require the detector and/or the source to remain fixed in position so scanning the detector to locate the source can not be used. A typical example of such a measurement would be monitoring a pedestrian portal or border crossing, looking for illegal radioactive materials. Another example would be monitoring barrels of low level radioactive waste, looking for sources that require special handling for disposal.

Low level radioactive waste is usually contained in standard 55-gallon drums. The drum is placed on a measurement platform located at a fixed position relative to a gamma-ray spectrometer and a gamma-ray spectrum obtained. The energies measured in the spectrum identify the specific radioactive isotope. The count rate at specific energies is indicative of the amount of the isotope present. If the radioactive source happens to be located in the drum close to the detector the count rate will be relatively high. If the source is located further away, the count rate will be lower. Rotation of the barrel around its axis can be used to average out some of this variation. Moving the drum (or the detector) along the vertical axis of the drum can also give a result more indicative of the average radiation level.

A higher than normal indication of a dangerous isotope will require a measurement to more accurately locate the exact position of the source. Placing a collimator between the detector and the drum, so that the radiation seen by the detector can only come from a specific direction, gives position information but only by drastically reducing the counting efficiency. Reduced counting efficiency requires a longer counting time in order to estimate the intensity of the source. Making the collimator smaller improves the position information but reduces the counting efficiency. Making the collimator larger improves the counting efficiency but degrades the position information.

BRIEF SUMMARY OF THE INVENTION

A gamma-ray spectrometer is provided consisting of plurality of individual gamma-ray detectors located at known locations. The array of gamma-ray detectors is arranged along one or more dimensions of a container to be assayed. A collimator associated with each of the gamma-ray detectors eliminates exposure to radiation from sources other than the container to be assayed. There are no collimators disposed between the gamma-ray detectors and the container to be assayed, so all of the gamma-ray detectors see the radiation source regardless of its position. The energy from the gamma-ray photons incident upon each of the gamma-ray detectors is recorded individually and a gamma-ray spectrum from each individual gamma-ray detector is recorded.

The position sensitive gamma-ray spectrometer is calibrated by placing a known mixed isotope radioactive source at various calibration positions, which are positions in space relative to the individual detectors where containers will be assayed, and recording spectra in each of the gamma-ray detectors. Generally, there is a one-to-one correspondence between the number of calibration positions and the number of gamma-ray detectors used. Further, the calibration positions are generally located at the same vertical positions of the gamma-ray detectors. The number of recorded spectra resulting from calibration is equal to the number of gamma-ray detectors times the number of calibration positions. From the calibration spectra, counting efficiency curves for each of the gamma-ray detectors are calculated. For a given energy, each of the gamma-ray detectors has a counting efficiency for each of the calibration positions. Using this information, the activity of an unknown source relative at each of the calibration positions is calculated and the relative activity levels for each position correlates to the position within the container being assayed.

The position information is not in the form of an actual image such as an X-ray or a photograph. The calculated result yields the activities of reference sources that, if placed in the positions used for calibration, duplicate the count rates experimentally observed at the individual detectors. If the calibration positions are carefully chosen, the result yields useful information about the actual distribution of radioactive material.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A radiation spectrometer for identifying, quantifying, and locating a radioactive source in a target, or a position sensitive radiation spectrometer, is shown at 300 in the figures. The position sensitive radiation spectrometer includes an array of gamma-ray detectors arranged along one or more dimensions of a container to be assayed. A known source placed at various calibration positions is used to establish counting efficiencies at discrete gamma ray energies emitted by known isotopes of interest. From the counting efficiency and the actual count rate, the activity level of an unknown source relative to the calibration positions is calculated. The relative activity levels correlate to the position of unknown source and provide useful information about the actual distribution of radioactive material.

Figure 1:
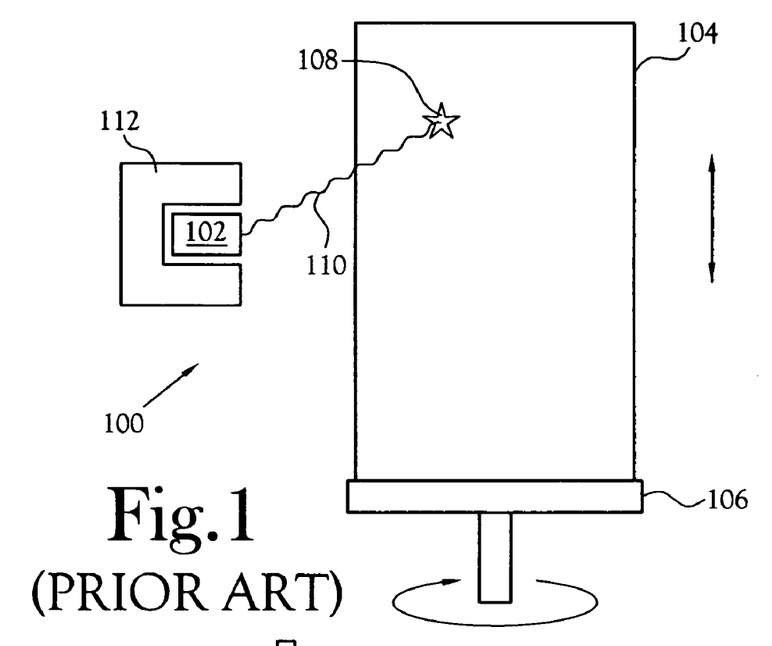
FIG. 1 depicts a prior art 55-gallon drum scanning system.

FIG. 1 illustrates a prior art gamma-ray spectroscopy system 100 used to measure radiation from a 55-gallon drum 104 of low-level radioactive waste. A gamma-ray detector 102 records the spectrum of radiation from the drum 104. A platform 106 supports the drum 104 and may optionally rotate the drum 104 around its vertical axis and vertically translate the position of drum 104 a total distance approximately equal to its height to fully expose the drum 104 to the gamma-ray detector 102. A radioactive source 108 emits a characteristic gamma-ray photon 110. The gamma-ray detector 102 detects and records the energy of the gamma-ray photon 110. A collimator 112 prevents the gamma-ray detector 102 from seeing background radiation from sources other than the drum 104. The rotation and the translation of the drum 104 is necessary to fully expose the radioactive source 108 to the detector 102. Unfortunately, the rotation and the translation of the drum 104 causes the average number of counts from the radioactive source 108 to be approximately the same as if the radioactive source 108 was located near the center of the drum 104. Accordingly, the prior art gamma-ray spectroscopy system 100 can identify and quantify the radiation of radioactive source 108, but the prior art gamma-ray spectroscopy system 100 cannot effectively locate the position of the radioactive source 108 with any precision.

Figure 2:
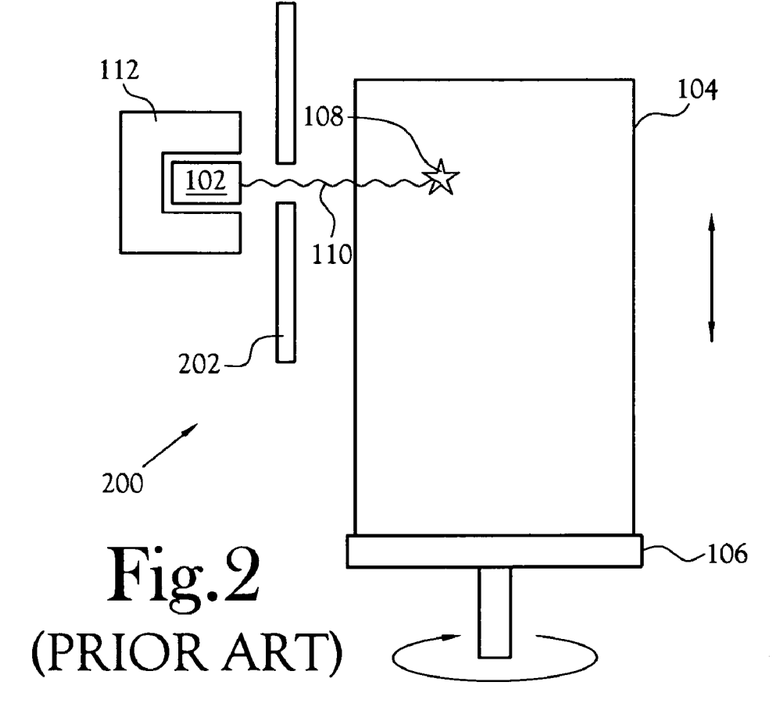
FIG. 2 depicts the system of FIG. 1 with the addition of a collimator for obtaining position information, as used in the prior art.

FIG. 2 illustrates another prior art sensing gamma-ray spectrometer 200. Unlike the prior art gamma-ray spectroscopy system 100 of FIG. 1, the prior art gamma-ray spectroscopy system 200 of FIG. 2 can locate the position of the radioactive source 108. The prior art gamma-ray spectroscopy system 200 of FIG. 2 is similar to the prior art gamma-ray spectroscopy system 100 of FIG. 1 but has a second collimator 202 disposed between the drum 104 and the gamma-ray detector 102. The gamma-ray detector 102 sees the radiation from the radioactive source 108 and records the radiation energy only when the drum 104 is moved to a position where the emitted gamma-ray photon 110 can pass through the second collimator 202 and strike the gamma-ray detector 102. The gamma-ray photons 110 emitted from the radioactive source 108 are blocked at all other times. Accordingly, the gamma-ray spectroscopy system 200 of FIG. 2 gains the ability to locate the position of the radioactive source with some precision at the expense of a significant loss in counting efficiency.

Figure 3:
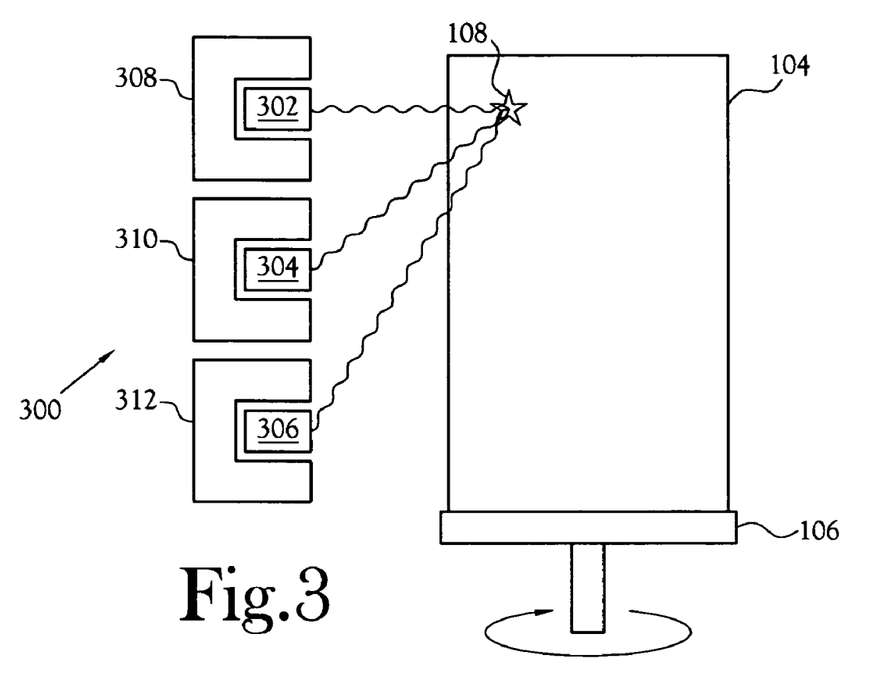
FIG. 3 depicts the multiple detector position sensitive radiation spectrometer of the present invention.

FIG. 3 illustrates one embodiment of a position sensitive radiation spectrometer 300 according to the present invention. The platform 106 of the position sensitive radiation spectrometer 300 is not required to move in a vertical direction. Instead, the position sensitive radiation spectrometer 300 employs multiple gamma-ray radiation detectors 302, 304, 306 to locate the position of the radioactive source 108. For purposes of discussion, three gamma-ray radiation detectors 302, 304, 306 are used to illustrate the concept of the position sensitive radiation spectrometer. The gamma-ray radiation detectors 302, 304, 306 are placed in known locations. As with the prior art, the platform 106 is capable of rotating the drum 104 around its vertical axis; however, rotational motion is not necessary to the present invention.

Using the 55-gallon drum scanning application as an example, the first radiation detector 302 is vertically located near the top of the drum 104. The second gamma-ray detector 304 is vertically located proximate the center of the drum 104. The third radiation detector 306 is located near the bottom of the drum 104. A collimator 308, 310, 312 associated with each of the three gamma-ray detectors 302, 304, 306 eliminates exposure to radiation from sources other than the drum 104. There are no collimators disposed between the three gamma-ray detectors 302, 304, 306 and the drum 104, so all of the three gamma-ray detectors 302, 304, 306 can see the radiation source 108 regardless of its position. The energy from the gamma-ray photons 100 incident upon each of the three gamma-ray detectors 302, 304, 306 is recorded individually. During a scan, gamma-ray spectra from each individual gamma-ray detector 302, 304, 306 are recorded.

Figure 4:
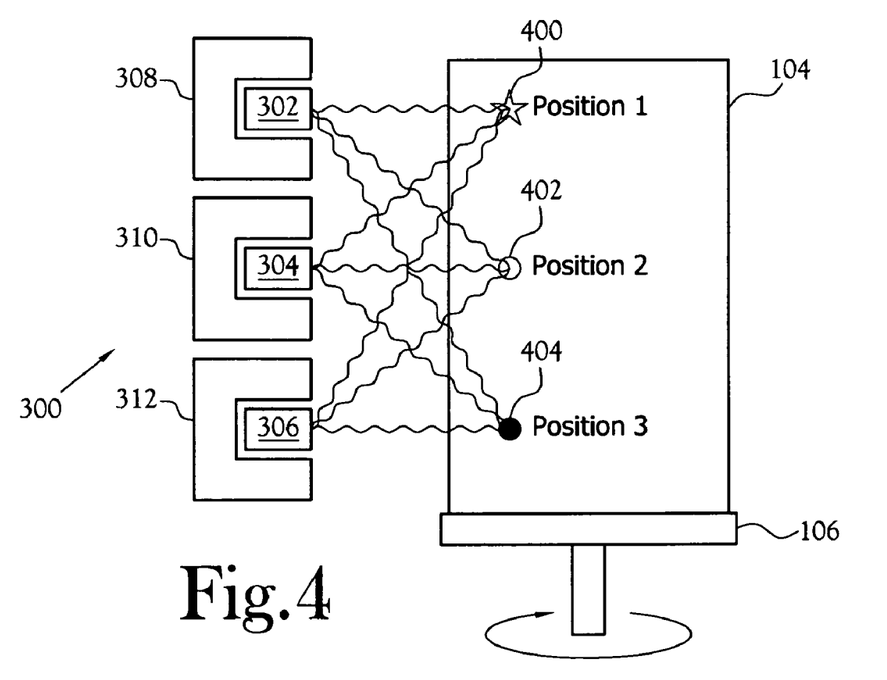
FIG. 4 depicts the calibration technique used with the multiple detector position sensitive radiation spectrometer of FIG. 3.

FIG. 4 shows the method of calibrating the position sensing gamma-ray spectrometer 300. A known mixed isotope radioactive source is placed at various positions within the drum 104 and spectra are recorded in each of the gamma-ray detectors 302, 304, 306. In one embodiment, the first calibration position 400 is near the top and on the vertical axis of the drum 104 when supported by the platform 106. The second calibration position 402 is near the center and on the vertical axis of the drum 104 when supported by the platform 106. The third calibration position 404 is near the bottom and on the vertical axis of the drum 104 when supported by the platform 106. Spectra are recorded at each of the gamma-ray detectors 302, 304, 306 with the known source located at three calibration positions 400, 402, 404 resulting in nine recorded spectra. From the nine recorded spectra, counting efficiency curves for each of the gamma-ray detectors 302, 304, 306 are calculated. For a given energy, each of the gamma-ray detectors 302, 304, 306 has a counting efficiency for each of the calibration positions 400, 402, 404.

The derivation of counts for each gamma-ray detector 302, 304, 306 are given by Equations 1, 2, and 3, respectively.

$$C_1 = E_{11}A_1 + E_{12}A_2 + E_{13}A_3 \quad (1)$$

$$C_2 = E_{21}A_1 + E_{22}A_2 + E_{23}A_3 \quad (2)$$

$$C_3 = E_{31}A_1 + E_{32}A_2 + E_{33}A_3 \quad (3)$$

Equation 1 states that the total number of counts, $C_1$, recorded by the first gamma-ray detector 302 at a given energy is equal to the counting efficiency, $E_{11}$, for the first calibration source located at the first calibration position 400 times the activity at the first calibration position 400, $A_1$, plus the counting efficiency, $E_{12}$, for the calibration source located at the second calibration position 402 times the activity at the second calibration position 402, $A_2$, plus the counting efficiency, $E_{13}$, for the third calibration source 404 located at the third calibration position 404 times the activity at the third calibration position 404, $A_3$. Similarly, Equations 2 and 3 apply to the second and third gamma-ray detectors 304, 306, respectively.

Equations 1, 2, and 3 represent equations in three unknown activities. The counting efficiency of each of the gamma-ray detectors 302, 304, 306 are known. The total number of counts in each of the gamma-ray detectors 302, 304, 306 is experimentally determined. Only the activity at each position 400, 402, 404 remains unknown.

Equations 4 and 5 represent the usual matrix notation for the solution of the equations.

$$\vec{C} = \vec{E}\vec{A} \qquad (4)$$

$$\vec{E}^{-1}\vec{C} = \vec{E}^{-1}\vec{E}\vec{A} = \vec{A} \qquad (5)$$

Equation 4 represents a total counts matrix, C, equal to an activity matrix, A, multiplied by an efficiency matrix, E. The inverse matrix, $E_{inverse}$ is found by standard techniques and used to calculate the activity matrix, A. Referring again to FIG. 3, when applied to an assay of an unknown source 108, the calculated result represents the unknown source 108 as three separate sources located at the first calibration position 400, the second calibration position 402, and the third calibration position 404. By way of example, if the unknown source 108 is actually located at the second calibration position 402, the activity at the first calibration position 400 and the third calibration position 404 is calculated as zero and the activity at the second calibration position 402 is the actual activity. Thus, the position of the unknown source 108 becomes known by the relative activity levels. If the unknown source 108 is located halfway between the first calibration position 400 and the second calibration position 402, the activity at the first calibration position 400, $A_1$, is half of the actual activity, the activity at the second calibration position 402, $A_2$, and the activity at the third calibration position 404, $A_3$, is zero. As before, the position of the unknown source 108 is known by the relative activity levels. When the unknown source 108 is located in other positions, solving the matrix of Equation 5 yields similar results. Because the gamma-ray detectors 302, 304, 306 are not blinded by interposing collimators, as with the prior art show shown in FIG. 2, the spectrometer 300 gains position sensing capability with no loss of counting efficiency.

The position information is not in the form of an actual image such as an X-ray or a photograph. The calculated result yields the activities of reference sources that, if placed in the positions used for calibration, duplicate the count rates experimentally observed at the individual detectors. If the calibration positions are carefully chosen, the result yields useful information about the actual distribution of radioactive material.

Figure 5:
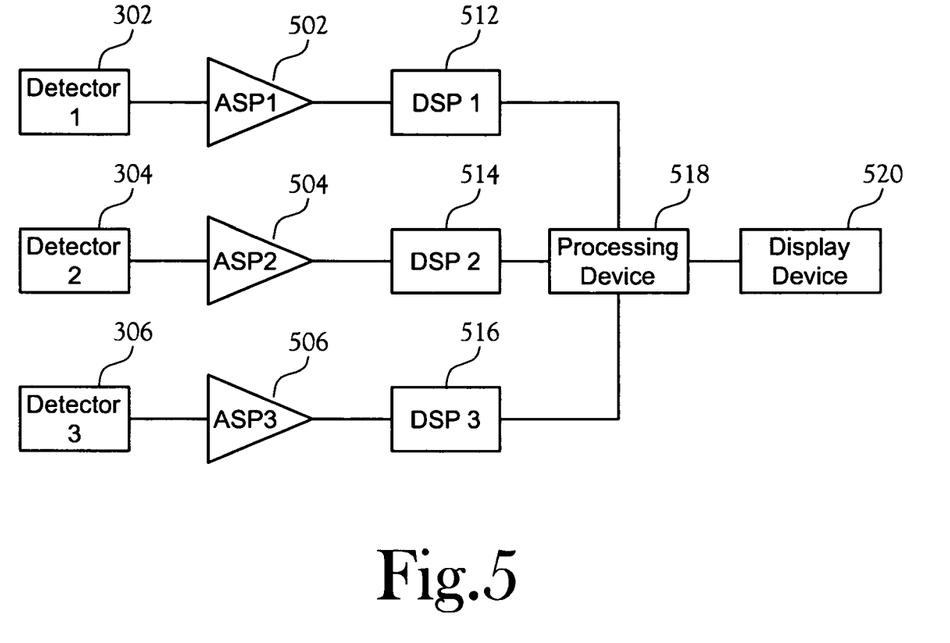
FIG. 5 illustrates a block diagram of multiple detector position sensitive radiation spectrometer of the present invention.

FIG. 5 is a block diagram of the position sensitive radiation spectrometer of the present invention. In the illustrated embodiment, the position sensitive radiation spectrometer uses three input channels. Each input channel processes an input from one of the radiation detectors 302, 304, and 306. The output of each radiation detector 302, 304, and 306 feeds an analog signal processor 502, 504, and 506. A digital signal processor 512, 514, and 516 further processes the analog signal to produce an energy spectrum observed by each detector 302, 304, and 306. A processing device 518, typically a personal computer, receives the energy spectra from each channel and performs all necessary calculations. A display device 520 presents intermediate data and final results to the operator.

Figure 6:
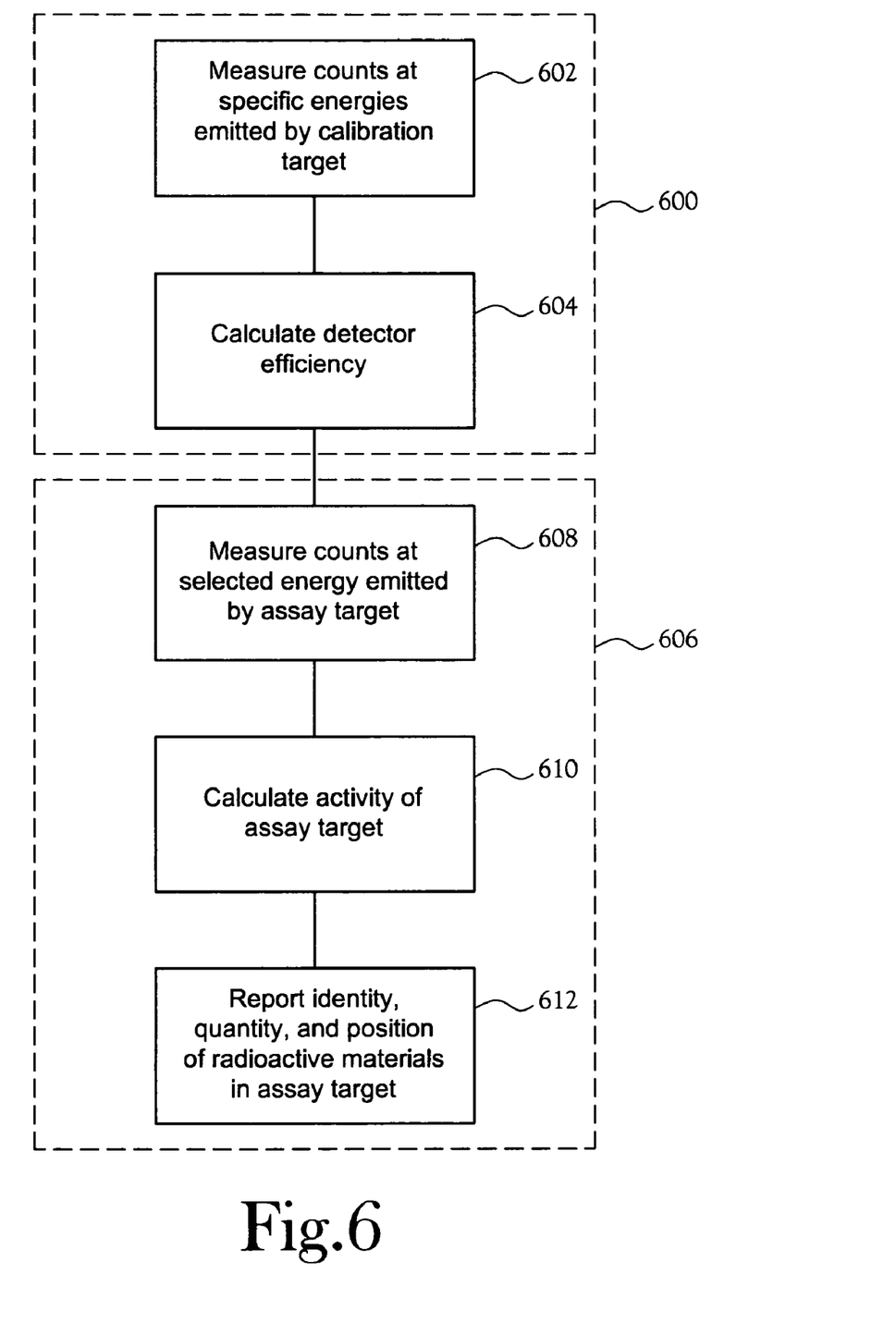
FIG. 6 is a flow chart of the general method of calibrating the spectrometer and then obtaining identity, quantity, and position information from an unknown source.

FIG. 6 is a flow chart showing the method used to calibrate the multiple-detector spectrometer and then record gamma-ray spectra with position, quantity, and identity information. Calibration measurements are taken using a calibration source emitting known gamma ray energies. The calibration process 600 for the multiple-detector spectrometer involves two primary steps. First, the spectrometer records a gamma ray spectrum 602 using each detector with a calibration source placed in a known calibration position, i.e., records the counts at specific energies. Second, the spectrometer calculates the detector efficiency 604 for each detector.

After completing the calibration process 600, the spectrometer is prepared to run an assay process 606 on an unknown source and determine the identity, quantity, and position of the radioactive materials. The first step of the assay process 606 is to record a gamma ray spectrum from the unknown source using each detector 608, which provides the number of counts actually seen by the detectors. Using the measured total counts of each detector and the efficiency of each detector at a selected energy value, the spectrometer solves a series of simultaneous equations to find the activity of the gamma rays emitted by he unknown spectrum 610 for at each energy level. The measured and calculated values allow the spectrometer to report the identity, quantity, and position of the unknown source 612.

Figure 7:
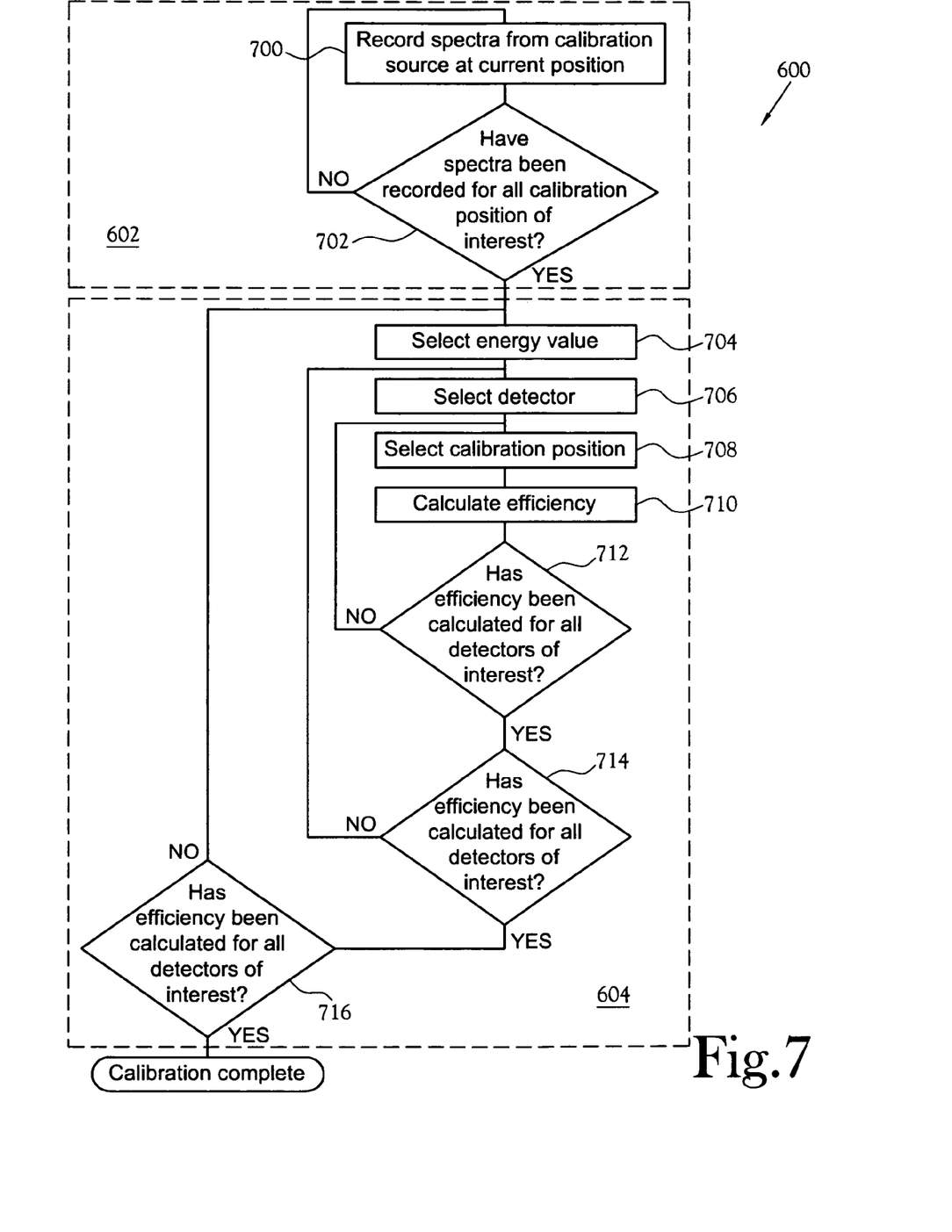
FIG. 7 is a flow chart of the method of calibrating the spectrometer.

FIG. 7 illustrates the calibration process 600 in greater detail. First, the process of obtaining calibration spectra 602 is examined. In order to calibrate the spectrometer, the spectrometer records a calibration spectrum at each detector with the calibration source placed in a first known calibration position 700. Additional calibration spectra are recorded by each detector with the calibration source located in other known calibration positions, until a desired number of spectra sets have been recorded 702. Typically, the number of calibration positions is equal to the number of detectors. In the case of the exemplary setup shown in FIG. 3 having three separate detectors located at known positions, the radioactive source is placed in three known locations within the assay area to produce a total of nine spectra (3 detectors×3 source positions).

Once the calibration spectra have been recorded, the efficiency of each detector is calculated for each of the energies of interest 604. The calibration source emits gamma rays at particular energies at a known rate allowing the spectrometer to calculate the maximum gamma ray emissions for the exposure time. In order to calculate the efficiency of the detector, the spectrometer selects an energy of interest 704, a detector 706, and a calibration position of interest 708. Using these parameters, the corresponding spectrum is selected. Determining the ratio of the actual number of counts in the selected spectrum at the selected energy for the selected detector with the calibration source at the selected position to the maximum number of emissions from the calibration source at the selected energy gives the efficiency of the selected detector at the selected energy 710. The spectrometer repeats the efficiency calculation process 604 until efficiency of each detector 714 for each position of the calibration source 712 at each of the energies of interest 716 has been calculated. Those skilled in the art will recognize that the order of the iterations may vary without departing from the scope and spirit of the present invention. For example, the spectrometer could analyze one spectrum for efficiency at all energy values before moving onto the next spectrum or could analyze all spectrums at a single energy value before moving on to the next energy value. At the conclusion of calibration, the spectrometer is left with a detector efficiency matrix that groups the detector efficiency values for the energies of interest by detector.

Figure 8:
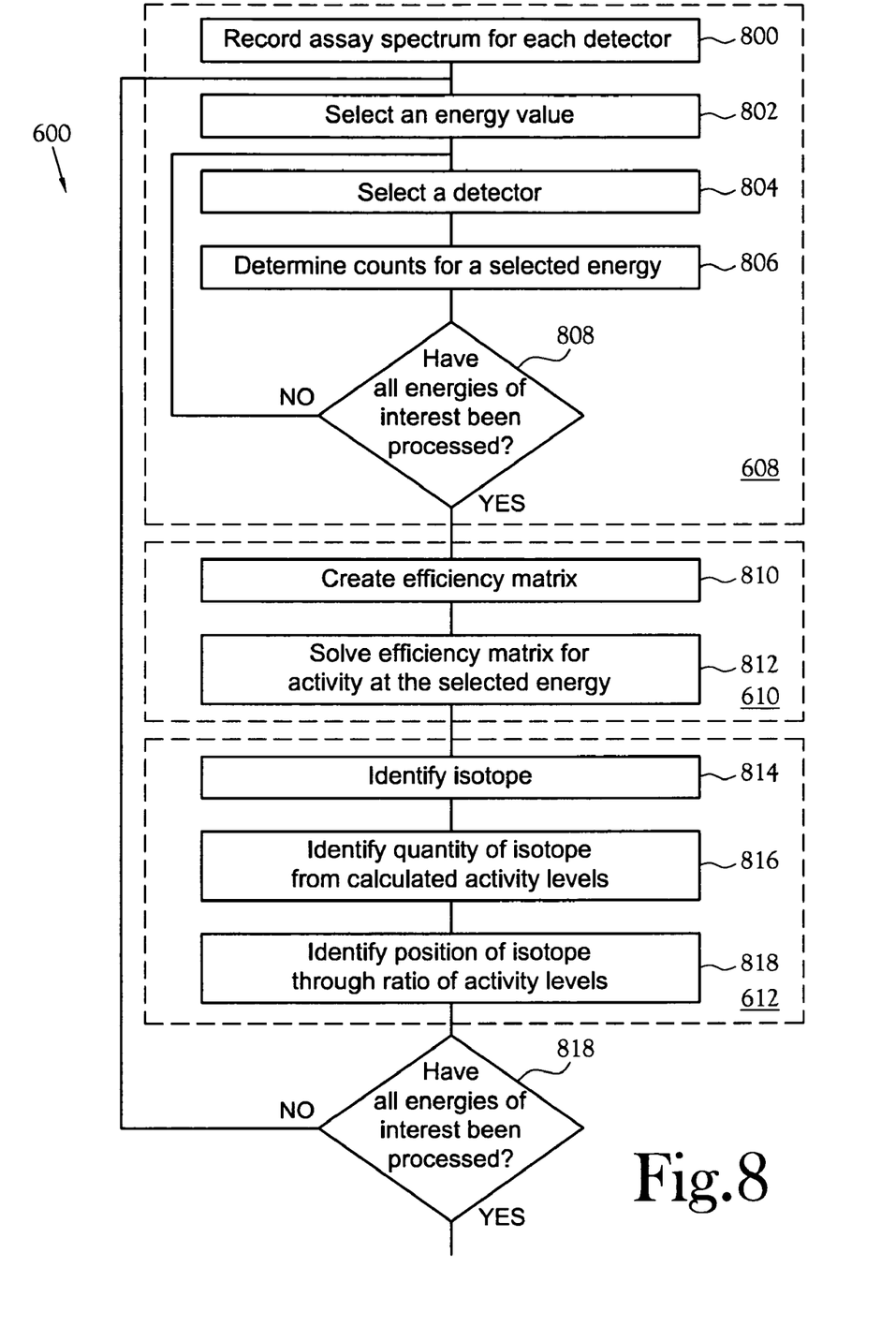
FIG. 8 is a flow chart of the method of identifying, quantifying, and determining position of an isotope.

FIG. 8 is a flowchart of the assay process 606 in greater detail. The assay process begins with the recording of gamma ray spectra using each of the detectors 800. Processing of the spectra begins by selecting an energy of interest 802. Next, the count rate for each detector is determined 608. A detector is selected 804 and the number of counts for the selected energy recorded by the detector is determined 806. The calculation is repeated until the total counts for each detector obtained during assay for the selected energy have been determined 808.

With the actual count rate for each detector experimentally determined during the assay process and the detector efficiency values at various energies for each detector experimentally determined during the calibration process, Equation 5 can be solved to determine the activity seen by each detector at various energy values. If a matrix of detector efficiency values at a particular energy has not been previously created and inverted as part of the calibration process, the creation and inversion of the matrix performed at this point 810. Those skilled in the art will recognize that the timing of the inversion is a matter of choice. The series of simultaneous equations represented by the efficiency matrix and the matrix of total counts per detector is solved 812. The resulting solution matrix holds the activity values at various energies across all detectors. By analyzing the lines in the spectra produced by the assay target, the isotope(s) present are determined 814. Typically, the sum of the activities at the various energy values corresponding to the isotope shows the quantity of the isotope present 816; however, those skilled in the art will recognize other ways of quantifying the isotope which may be appropriate. The ratio of activities at the various energy values provides valuable information about the relative location of the gamma-ray emitting isotope 818. This information is reported to the user in either a raw form or can be processed using logic within the spectrometer to provide an analysis of the spectroscopy results 612.

It will be obvious to those skilled in the art that other arrangements can be used to produce similar results without departing from the scope and spirit of the present invention. Three detectors and three calibration positions are shown and described but the method also works with other numbers of detectors and calibration positions, for example, two detectors and two calibration positions or four detectors and four calibration positions. A specific example of radioactive waste assay of 55-gallon drums has been chosen for illustration but the method and apparatus could be used to locate a "dirty bomb" hidden in a truck. While a linear array of detectors has been described, those skilled in the art will recognize that a two-dimensional array of detectors, for example a rectangular array of detectors, could also be used without departing from the scope and spirit of the present invention. Further, although the radiation described herein was identified as gamma-ray radiation, those skilled in the art will appreciate that other types of radiation can be identified, quantified, and located by substituting appropriate detectors without departing from the scope and spirit of the present invention. Finally, those skilled in the art will recognize that the efficiency of the detectors could be predetermined and stored in the spectrometer, allowing the end-user to take advantage of the location features without the need for on-site calibration prior to use.

While at least one embodiment has been shown and described, it will be understood that it is not intended to limit the disclosure, but rather it is intended to cover all modifications and alternate methods falling within the spirit and the scope of the invention as defined in the appended claims.

What is claimed is:

1. A method for identifying, quantifying, and locating an unknown source of gamma-ray emissions with little loss of detector efficiency, said method comprising the steps of:
    (a) recording a first calibration spectrum using a first detector with a calibration source located at a first source position, said calibration source having a known set of characteristic energies;
    (b) recording a second calibration spectrum using a second detector with the calibration source located at the first source position;
    (c) recording a third calibration spectrum using said first detector with the calibration source located at a second source position;
    (d) recording a fourth calibration spectrum using said second detector with the calibration source located at the second source position;
    (e) calculating a first set of detector efficiency values, said first set of detector efficiency values comprising an efficiency value at a selected energy for said first detector from each of said first calibration spectrum and said third calibration spectrum;
    (f) calculating a second set of detector efficiency values, said second set of detector efficiency values comprising an efficiency value at said selected energy for said second detector from each of said second calibration spectrum and said fourth calibration spectrum;
    (g) recording a first assay spectrum using said first detector to measure an unknown source;
    (h) recording a second assay spectrum using said second detector to measure the unknown source;
    (i) determining a first count total at said selected energy from said first assay spectrum;
    (j) determining a second count total at said selected energy from said second assay spectrum;
    (k) calculating a first activity value and a second activity value using said first set of detector efficiency values, said second set of detector efficiency values, said first count total, and said second count total;
    (l) identifying an isotope in said unknown source based upon said first assay spectrum and said second assay spectrum, the isotope having a characteristic energy equal to said selected energy;
    (m) quantifying an isotope in said unknown source based upon said first activity value and said second activity value; and
    (n) estimating a position of an isotope in said unknown source based upon a ratio of said first activity value and said second activity value.

2. The method of claim 1 further comprising the step of repeating steps (e) through (f) for a selected number of energies.

3. The method of claim 1 further comprising the step of repeating steps (i) through (k) for a selected number of energies.

4. The method of claim 1 further comprising the step of repeating steps (l) through (n) for a selected number of characteristic energies.

5. A radiation spectrometer for identifying, quantifying, and locating an unknown source, the unknown source having an set of characteristic energies produced by emitted gamma-ray photons, said radiation spectrometer calibrated using a calibration source having a known set of characteristic energies produced by emitted gamma-ray photons, the calibration source being placed in a first calibration position and a second calibration position, said radiation spectrometer comprising:

a first radiation detector positioned at a first location;

a second radiation detector positioned at a second location;

a processing device in communication with each of said first radiation detector and said second radiation detector, said processing device executing a first process and a second process, said first process including the steps of:

(a) recording a first calibration spectrum using a first detector with a calibration source located at a first source position, said calibration source having a known set of characteristic energies;

(b) recording a second calibration spectrum using a second detector with the calibration source located at the first source position;

(c) recording a third calibration spectrum using said first detector with the calibration source located at a second source position;

(d) recording a fourth calibration spectrum using said second detector with the calibration source located at the second source position;

(e) calculating a first set of detector efficiency values, said first set of detector efficiency values comprising an efficiency value at a selected energy for said first detector from each of said first calibration spectrum and said third calibration spectrum; and (f) calculating a second set of detector efficiency values, said second set of detector efficiency values comprising an efficiency value at said selected energy for said second detector from each of said second calibration spectrum and said fourth calibration spectrum; and said second process comprising the steps of:

(g) recording a first assay spectrum using said first detector to measure an unknown source;

(h) recording a second assay spectrum using said second detector to measure the unknown source;

(i) determining a first count total at said selected energy from said first assay spectrum;

(j) determining a second count total at said selected energy from said second assay spectrum;

(k) calculating a first activity value and a second activity value using said first set of detector efficiency values, said second set of detector efficiency values, said first count total, and said second count total;

(l) identifying an isotope in said unknown source based upon said first assay spectrum and said second assay spectrum, the isotope having a characteristic energy equal to said selected energy;

(m) quantifying an isotope in said unknown source based upon said first activity value and said second activity value; and (n) estimating a position of an isotope in said unknown source based upon a ratio of said first activity value and said second activity value.

6. The method of claim 5 said first process further comprising the step of repeating steps (e) through (h) for a selected number of energies.

7. The method of claim 5 said second process further comprising the step of repeating steps (k) through (m) for a selected number of energies.

8. The method of claim 5 said second process further comprising the step repeating steps (n) through (p) for a selected number of characteristic energies.

9. A method for identifying, quantifying, and locating an unknown source of gamma-ray emissions with little loss of detector efficiency, said method comprising the steps of:

(a) recording a plurality of calibration spectra from a calibration source having a known set of characteristic energies using an array of detectors, each of said plurality of calibration spectra associated with one of said array of detectors with the calibration source located at one of a plurality of calibration positions;

(b) calculating a plurality of sets of detector efficiency values, each of said plurality of sets of detector efficiency values comprising an efficiency value at a selected energy for each of said plurality of calibration spectra;

(c) recording a plurality of assay spectra using said array of detectors and an unknown source;

(d) determining a plurality of sets of count totals, each of said plurality of sets of count totals comprising a count total at a selected energy from each of said plurality of assay spectra;

(e) calculating a plurality of sets of activity values using selected sets from said plurality of sets of detector efficiency values corresponding to a selected energy and a selected one of said plurality of sets of count totals corresponding to said selected energy, each said plurality of sets of activity value comprising activity values at a selected energy for each of the plurality of calibration positions;

(f) identifying each isotope in the unknown source based upon said plurality of assay spectra, each said isotope having a characteristic energy;

(g) quantifying each isotope in the unknown source based upon a selected set from said set of activity levels corresponding to the characteristic energy of each isotope; and (h) estimating a position of each isotope in the unknown source based upon a ratio of activity levels in said plurality of sets of activity values corresponding to the characteristic energy of each isotope.

10. The method of claim 9 wherein said step of calculating a plurality of sets of detector efficiency values uses known properties of each detector in the array of detectors.

11. A radiation spectrometer for identifying, quantifying, and locating an unknown radioactive source, the unknown source having an set of characteristic energies produced by emitted gamma-ray photons, said radiation spectrometer calibrated using a calibration source having a known set of characteristic energies produced by emitted gamma-ray photons, the calibration source being placed in a plurality of calibration positions, said radiation spectrometer comprising:

a plurality of radiation detectors arranged at known locations;

a processing device in communication with said plurality of radiation detectors, said processing device executing a first process and a second process, said first process including the steps of:

(a) recording a plurality of calibration spectra from a calibration source having a known set of characteristic energies using an array of detectors, each of said plurality of calibration spectra associated with one of said array of detectors with the calibration source located at one of a plurality of calibration positions; and (b) calculating a plurality of sets of detector efficiency values, each of said plurality of sets of detector efficiency values comprising an efficiency value at a selected energy for each of said plurality of calibration spectra; and said second process comprising the steps of:

(c) recording a plurality of assay spectra using said array of detectors and an unknown source;

(d) determining a plurality of sets of count totals, each of said plurality of sets of count totals comprising a count total at a selected energy from each of said plurality of assay spectra;

(e) calculating a plurality of sets of activity values using selected sets from said plurality of sets of detector efficiency values corresponding to a selected energy and a selected one of said plurality of sets of count totals corresponding to said selected energy, each said plurality of sets of activity value comprising activity values at a selected energy for each of the plurality of calibration positions;

(f) identifying each isotope in the unknown source based upon said plurality of assay spectra, each said isotope having a characteristic energy;

(g) quantifying each isotope in the unknown source based upon a selected set from said set of activity levels corresponding to the characteristic energy of each isotope; and (h) estimating a position of each isotope in the unknown source based upon a ratio of activity levels in said plurality of sets of activity values corresponding to the characteristic energy of each isotope.

12. A method for determining a location of a radioactive target within a three-dimensional volume using a gamma spectrometer having a plurality of radiation detectors, the radioactive target emitting gamma-ray photons having a set of characteristic energies said method comprising the steps of:

(a) obtaining a plurality of sets of detector efficiency values, each of said plurality of sets of detector efficiency values corresponding to a selected energy;

(b) recording a plurality of assay spectra using said array of detectors and an unknown source;

(c) determining a plurality of sets of count totals, each of said plurality of sets of count totals comprising a count total at a selected energy from each of said plurality of assay spectra;

(d) calculating a plurality of sets of activity values using selected sets from said plurality of sets of detector efficiency values corresponding to a selected energy and a selected one of said plurality of sets of count totals corresponding to said selected energy, each said plurality of sets of activity value comprising activity values at a selected energy for each of the plurality of calibration positions;

(e) identifying each isotope in the unknown source based upon said plurality of assay spectra, each said isotope having a characteristic energy;

(f) quantifying each isotope in the unknown source based upon a selected set from said set of activity levels corresponding to the characteristic energy of each isotope; and (g) estimating a position of each isotope in the unknown source based upon a ratio of activity levels in said plurality of sets of activity values corresponding to the characteristic energy of each isotope.

* * * * *